UNITED STATES PATENT OFFICE.

OSCAR HAYDA, OF BOSTON, MASSACHUSETTS, ASSIGNOR OF ONE-THIRD TO EDWARD BERGÉ-SOLER, OF NEWTON HIGHLANDS, MASSACHUSETTS, AND ONE-THIRD TO ARTHUR J. FOTCH, OF DORCHESTER, MASSACHUSETTS.

PREPARATION OF FRUITS FOR FOODS AND BEVERAGES.

1,377,681. Specification of Letters Patent. Patented May 10, 1921.

No Drawing. Application filed January 18, 1921. Serial No. 438,236.

*To all whom it may concern:*

Be it known that I, OSCAR HAYDA, a citizen of the Republic of Czechoslovakia, and a resident of Boston, in the county of Suffolk and State of Massachusetts, have invented an Improvement in the Preparation of Fruits for Foods and Beverages, of which the following description is a specification.

This invention relates to the preparation of fruits for foods and beverages.

One of the objects of my invention is to preserve in the product, in so far as it is possible to do so, the qualities possessed by the fruit in its natural state, that is to say, all the qualities and properties of the fresh fruit and particularly the natural flavor and aroma. Another object of my invention is to prepare the fruit in such manner that it shall be ready for use in the preparation of pies, fine pastries, confectionery, ice creams, beverages and other delicacies without any further treatment.

These and other objects of my invention will be clearly understood from the following description of the best mode and manner now known to me for putting my invention into practice.

In carrying out my process the fruit is first split or cut into pieces, and in the case of fruits having large pips or stones these are removed. The cut up fruit thus obtained is then reduced to a relatively finely comminuted state. This may be effected in any suitable manner or by any suitable means as by forcing the fruit through a sieve or any other arrangement of perforations of suitable size. I do not limit myself to any particular means for this purpose. The finely comminuted pulp thus obtained is then placed in the receptacles in which it is intended to be kept, preferably in cans, and these being sealed, are then heated with their contents until the latter is completely sterilized. Ordinarily heating for a period of about fifteen minutes at a temperature of substantially 212° Fahrenheit is sufficient, but I do not limit myself to any particular temperature or length of time as these may be subject to variations under different conditions.

In some cases where the fruit after being cut or split shows a great amount of liquid, it may be heated for a short time in order to reduce its volume if this is thought necessary. I do not, however, recommend this, but if it is done, the heating should be continued for as short a period as possible, as otherwise, the natural aroma of the fruit may be lost to an appreciable degree. This is particularly so in the case of apricots and other fruit possessing a delicate aroma and flavor, and in the case of such fruits heating of the material previous to its being sealed in the cans should be avoided.

My process and the product thereof possess many advantages over similar products and processes heretofore used. So far as I am aware, in all processes of preserving fruit it has heretofore been the custom to heat or boil the pulp before canning it. The result of this has been that the pulp loses the greater part if not all of the flavor and aroma possessed by the fresh fruit. This cannot occur in my process as the pulp is not heated until it is sealed in the cans or other receptacles in which it is to be kept, all previous steps in my process being conducted preferably without the use of heat or at normal temperature. Furthermore, so far as I am aware, preserved fruit intended for pies, pastries, etc., has heretofore always been put up in the cans in relatively large pieces so that it had to be reduced to a fine state after it was removed from the cans and before it could be used. This step is entirely avoided by my process, in which the pulp is reduced to a finely comminuted state before it is placed in the cans.

When my process is used there is practically no loss or impairment whatever of the natural flavor and aroma possessed by the fresh fruit, the natural juices being retained practically unimpaired, the delicate flavor and aroma of such fruits as apricots, for example, being practically entirely preserved in the product of my process.

It will be readily recognized by those skilled in the art that my process and product possess other advantages besides those specifically pointed out.

Claims:

1. A process of preparing fruit for use in pies, fine pastries, confectionery, ice creams, beverages and other delicacies, which comprises reducing the fruit to a relatively finely comminuted state; sealing the pulp thus obtained in suitable receptacles; and sterilizing the contents of the receptacles by the application of heat.

2. A process of preparing fruit for use in pies, fine pastries, confectionery, ice creams, beverages and other delicacies, which comprises cutting or dividing the fruit into pieces; reducing the fruit to a relatively finely comminuted state; sealing the pulp thus obtained in suitable receptacles; and sterilizing the contents of the receptacles by the application of heat.

3. A process of preparing fruit for use in pies, fine pastries, confectionery, ice creams, beverages and other delicacies, which comprises cutting or dividing the fruit into pieces, removing the pips or stones, reducing the fruit to a relatively finely comminuted state; sealing the pulp thus obtained in suitable receptacles; and sterilizing the contents of the receptacles by the application of heat.

4. A process of preparing apricots for use in pies, fine pastries, confectionery, ice creams, beverages and other delicacies, which comprises cutting or dividing the apricots into pieces; removing the pips or stones; reducing the apricots to a relatively finely comminuted state; sealing the pulp thus obtained in suitable receptacles; and sterilizing the contents of the receptacles by the application of heat.

5. A process of preparing fruit for use as food and in beverages, which comprises reducing the raw fruit to a relatively finely comminuted pulp; and heating the said finely comminuted pulp thus obtained in a receptacle sealed from the surrounding atmosphere.

6. A process of preparing fruit for use as food and in beverages, which comprises reducing the raw fruit to a relatively finely comminuted pulp; and heating the finely comminuted pulp thus obtained to about 212° F. in a receptacle sealed from the surrounding atmosphere.

7. A process of preparing apricots for use as a food and in beverages, which comprises reducing the raw apricots to a relatively finely comminuted state; and heating the said relatively finely comminuted product in a receptacle sealed from the surrounding atmosphere.

8. As an article of manufacture, a hermetically sealed, sterilized package of finely comminuted apricot pulp, said pulp possessing substantially all the natural flavor and aroma of the fresh apricots.

In testimony whereof, I have signed my name to this specification.

OSCAR HAYDA.